Patented June 9, 1942

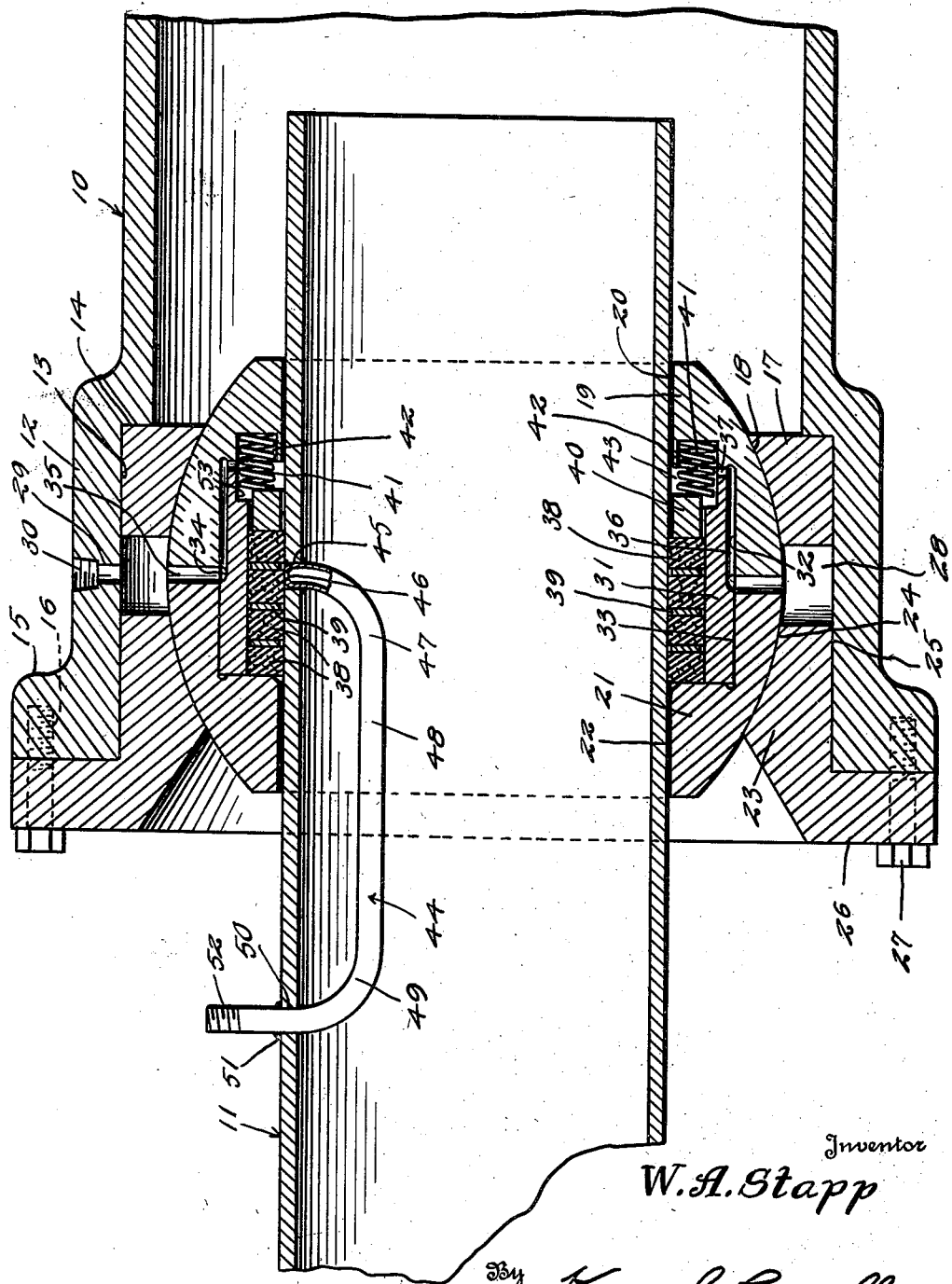

2,286,122

UNITED STATES PATENT OFFICE 2,286,122

STEAM PIPE BALL JOINT COUPLING

William A. Stapp, Elko, Nev.

Application February 12, 1941, Serial No. 378,659

5 Claims. (Cl. 285—11)

This invention relates to a pipe joint or coupling.

An object of this invention is to provide an improved steam pipe joint wherein the coupled elements may move relative to each other.

In couplings of the ball joint type at present available, where two elements are coupled together by a sliding and pivoted joint or coupling, it has been found that a proper seal cannot be maintained between the elements and if the packing about the joint is tightened to seal the joint, the elements are locked together. It is, therefore, another object of this invention to provide a coupling of this character wherein the several movable parts may be lubricated in such a manner as to prevent "freezing" of the joint.

A further object of this invention is to provide in a joint of this character, means whereby the coupling may be lubricated from within the innermost element so that the packing will not harden and the two elements may move endwise of the joint in addition to swinging one relative to the other.

To the foregoing objects and to others which may hereinafter appear, the invention consists of the novel construction, combination and arrangement of parts as will be more specifically referred to and illustrated in the accompanying drawing wherein are shown embodiments of the invention, but it is to be understood that changes, variations and modifications may be resorted to which fall within the scope of the invention as claimed.

In the drawing, there is disclosed a fragmentary longitudinal section of a pair of elements coupled together with a joint embodying this invention.

Referring to the drawing, the numeral 10 designates generally a steam chest which is adapted to be coupled to a valve chamber 11. The chamber 11 is shown fragmentarily and as here shown comprising a cylindrical element telescopes partly into the open end of the chest 10 and is substantially smaller in diameter than the diameter of the chest 10. The chest 10 is provided adjacent the free or open end thereof with an enlarged cylindrical bushing 12 forming a cylindrical inner chamber 13 which is substantially larger in diameter than the inner diameter of the chest 10 and a shoulder 14 is formed at the inner end of the bushing 12 where it is connected with the chest 10.

An annular flange or valve head 15 is formed integral with the boss or bushing 12 and the flange 15 is provided with a plurality of circumferentially spaced apart threaded openings 16 in which bolts, studs or the like are adapted to threadably engaged.

An annular ring or socket forming member 17 is disposed within the bushing 12 and is provided with parallel inner and outer faces and a cylindrical outer periphery which engages the bore 13 of the bushing 12. The ring or socket forming member 17 is adapted at its inner end to abut against the shoulder 14 and the ring or socket forming member 17 is provided with a concave inner surface 18 within which a parti-spherical joint forming member is adapted to engage as will be hereinafter described.

An inner annular parti-spherical member 19 is disposed loosely about the periphery of the inner member 11 and engages the concave surface 18 of the inner socket forming member 17. The inner member 19 is provided with a cylindrical bore 20 in which the inner member 11 slidably engages. A second or outer parti-spherical member 21 is disposed about the inner member, being formed with a cylindrical bore 22 in which the inner member 11 loosely engages and the outer parti-spherical member 21 is adapted at its inner end to abut against the outer end of the inner member 19 and form a substantially ball joint by means of which the two members 10 and 11 may pivot one relative to the other.

An outer socket forming member 23 is adapted to engage the outer ball forming member 21 being provided with an inner concave surface 24 and a cylindrical outer surface 25 which outer surface engages within the bore 13 of the bushing 12. The outer socket forming member 23 is adapted to snugly engage the arcuate surface of the joint member 21 and this outer member 23 is provided with an integral annular flange 26 which is adapted to abut against the flange 15 and thereby held thereagainst by means of bolts or fastening devices 27 which are threaded into the threaded openings 16.

As shown in the drawing, the inner end of the outer socket forming member 23 is spaced from the outer end of the inner socket forming member 17 so as to thereby form therebetween an annular lubricating chamber 28. The bushing or annular enlargement 12 is provided with a passage 29 therethrough having threads 30 for receiving a lubricating fitting so that a suitable lubricant may be discharged through the opening 29 into the lubricating chamber 28. In this manner, the contacting surfaces of the socket forming members 17 and 23 and the outer surfaces of the ball forming members 19 and 21 may be properly lubricated to permit swinging or pivotal movement of the two members 10 and 11 relative to each other.

A cylindrical member 31 engages in complementary annular recesses 32 and 33 which are formed in the ball forming members 19 and 21, respectively, and the cylindrical member 31 is provided centrally of the ends thereof with an annular lubricating groove or channel 34 with which a lubricating channel 35 communicates. The lubricating channel 35 is formed partly in the ball forming member 19 and partly in the ball forming member 21 and communicates at its outer end with the annular lubricating chamber 28. There may be as many of these lubricating channels 35 as may be desired, there being two shown which are disposed in diametrically opposed relation. The cylindrical member 31 is also provided in its periphery with a plurality of longitudinally extending lubricating channels 36, which at one end communicate with the inner end of the lubricating channel or duct 35 and at the other end communicate with a radial lubricating channel 37 formed in the inner end of the cylindrical member 31.

A plurality of cylindrical packing members 38 are disposed within the cylindrical member 31 and have an inner diameter substantially equal to the outer diameter of the inner member 11. The several packing members 38 are separated one from another by means of spacer rings 39 which may be formed of metal such as brass or the like. The packing members 38 are formed of suitable packing material which is of such a character that the ball forming members 19 and 21 will be thoroughly sealed so as to prevent steam or other fluid from leaking out of the joint between the ball forming members 19 and 21 and the periphery of the inner member 11. These packing members 38, however, permit endwise sliding movement of the inner member 11 relative to the ball forming members 19 and 21. The packing members 38 are held in tightly compressed condition by means of an annular compressing ring 40, which is disposed within the cylindrical member 31 and bears against the innermost one of the packing members 38.

The packing compressing ring 40 is held against the innermost packing member 38 by a plurality of helical springs 41 which at their outer ends bear against the inner side of the ring 40 and which are seated in sockets 42 formed in the ball forming member 19. The ball forming member 19 is provided with an annular lubricating chamber 43 with which the sockets 42 communicate and the lubricating ducts 37 communicate with the lubricating chamber 43 so that the ring 40 will be lubricated from the lubricating chamber 28. The packing compressing ring 40 is preferably of a diameter slightly greater than the outer diameter of the inner member 11 so that it may freely move within the inner diameter of the cylindrical member 31. In order to provide a means whereby the packing members 38 may be lubricated from the inside of the member 11 so that these packing members will not become hardened or "freeze" on the periphery of the inner member 11, I have provided a lubricating pipe 44 which at its inner end is welded into an opening 45, which is formed in the inner member 11 and disposed in a position whereby the lubricant discharged from the pipe 44 will come into direct contact with one or more of the packing members 38. The pipe 45 at its inner end may be formed with a reduced jet opening 46 confronting one of the packing members 38. The pipe 44 at its inner end is formed with an arcuate extension 47, the terminal end of which is welded in the opening 45 and the pipe 44 is then extended as at 48 in a direction parallel with the surface of the inner member 11 to a point outwardly beyond the socket forming member 23.

The outer portion of the pipe 44 is provided with a bend 49, which is extended through an opening 50 in the wall of the inner member 11 and is welded as at 51 so as to provide a tight joint through which the steam or other fluid is prevented from passing. The terminal end 52 of the pipe 44 is threaded in order to receive a suitable lubricating fitting or the like by means of which a lubricant under pressure may be discharged through the pipe 44 and into direct contact with one or more of the packing rings 38. As shown in the drawing, the inner portion of the cylindrical member 31 is cut out as at 53 so that the outer ends of the springs 42 may freely move outwardly and tightly hold the packing compressing ring 40 against the innermost of the packing rings.

With a coupling or joint of this kind the two elements 10 and 11 may move endwise one relative to the other and at the same time may also pivot one relative to the other, the ball forming members 19 and 21 rotating within the socket forming members 17 and 23. A suitable lubricant may be discharged into the lubricating chamber 28 and this lubricant will flow from the chamber 28 through the radial lubricating channels 35 into the annular lubricating channel 34 inwardly along the longitudinal lubricating channels 36 and then from these latter channels into the radial channels 37 and into the annular lubricating chamber 43. In this manner the springs 41 will be provided with a lubricant at all times and this lubricant will also provide a means whereby the packing compressing ring 40 will be lubricated so that this ring may freely slide within the cylindrical member 41 and along the peripheral surface of the inner element 11. The packings 38 may also be lubricated from the inside of the inner element 11 by forcing a lubricant through the pipe 44 for discharge through the opening 46 into direct contact with one or more of the packing members 38.

What I claim is:

1. In combination with a pair of telescoping fluid conducting elements, a combined coupling and lubricating structure, a socket structure carried by the outermost element, a ball structure slidably carried by the innermost element and engaging in said socket structure, packing means carried by said ball structure, said innermost element having a pair of spaced openings therethrough, one of said openings confronting said packing means and the other opening being disposed exteriorly of said socket structure, and a U-shaped lubricant conducting pipe disposed interiorly of said inner element and having the ends thereof fixed in said openings.

2. In combination with a pair of telescoping fluid conducting elements, a combined coupling and lubricating structure, a socket structure carried by the outermost element, a ball structure slidably carried by the innermost element and engaging in said socket structure, packing means carried by said ball structure, yieldable means constantly maintaining said packing means under compression, said innermost element having a pair of spaced openings therethrough, one of said openings confronting said packing means and the other opening being disposed exteriorly of said socket structure, and a U-shaped lubricant conducting pipe disposed interiorly of said inner element and having the ends thereof fixed in said openings.

3. In combination with a pair of telescoping fluid conducting elements, a combined coupling and lubricating structure, a socket structure carried by the outermost element, a ball structure slidably carried by the innermost element and engaging in said socket structure, packing means carried by said ball structure, said innermost element having a pair of spaced openings therethrough, one of said openings confronting said packing means and the other opening being disposed exteriorly of said socket structure, a U-shaped lubricant conducting pipe disposed interiorly of said inner element and having the ends thereof fixed in said openings, and a lubricant chamber formed in said socket structure, said ball structure having passages communicating with said chamber.

4. In combination with a pair of telescoping fluid conducting elements, a combined coupling and lubricating structure including a socket structure carried by one of said elements, a ball structure slidably carried by the other element and engaging said socket structure, packing means carried by said ball structure, and a lubricant conducting member carried by said other element, said member having one end thereof confronting said packing means and the other end thereof extending through said other element exteriorly of said ball structure.

5. In combination with a pair of telescoping fluid conducting elements, a combined coupling and lubricating structure including a socket structure carried by one of said elements, a ball structure slidably carried by the other element and engaging said socket structure, packing means carried by said ball structure, and means fixed relative to and extending interiorly of said other element for lubricating said packing means.

WILLIAM A. STAPP.